United States Patent [19]
Brunner et al.

[11] Patent Number: 5,166,532
[45] Date of Patent: Nov. 24, 1992

[54] EDGE SENSOR FOR A MOVING STRIP OF MATERIAL

[75] Inventors: Gerhard Brunner, Augsburg; Wolfgang Krauth, Friedberg, both of Fed. Rep. of Germany

[73] Assignee: Erhardt & Leimer GmbH, Augsburg, Fed. Rep. of Germany

[21] Appl. No.: 671,777

[22] PCT Filed: Aug. 25, 1990

[86] PCT No.: PCT/EP90/01425
§ 371 Date: Apr. 16, 1991
§ 102(e) Date: Apr. 16, 1991

[87] PCT Pub. No.: WO91/02941
PCT Pub. Date: Mar. 7, 1991

[30] Foreign Application Priority Data
Aug. 25, 1989 [DE] Fed. Rep. of Germany ....... 3928159

[51] Int. Cl.[5] .............................................. G01V 9/04
[52] U.S. Cl. ................................. 250/548; 250/227.31
[58] Field of Search ................... 250/227.31, 548, 557, 250/561, 560; 356/383, 384

[56] References Cited

U.S. PATENT DOCUMENTS

| | | | |
|---|---|---|---|
| 4,002,919 | 1/1977 | Linard | 250/227.31 |
| 4,157,477 | 6/1979 | Kall et al. | 250/227.31 |
| 4,827,120 | 5/1989 | Stauffer | 250/227.31 |
| 5,021,674 | 6/1991 | Brunner | 250/548 |

Primary Examiner—David C. Nelms
Assistant Examiner—Que T. Le
Attorney, Agent, or Firm—Collard & Roe

[57] ABSTRACT

An edge sensor for a moving web of material includes an elongated light source on which is mounted a receiver containing an active receiver element made of a plastics material with light-absorbing properties. The receiver element comprises an elongated light input surface and at least one light exist on which a light detector is provided. The receiver element is an elongated hollow body made of a light-absorbing plastics material which is supported directly in the receiver in such a way that is light input surface is directly exposed to the light from the light source which falls on the web. A hollow body which is, or can be made, self-supporting directly and without accessories results in a simpler structure and optimal use of light. The hollow body is particularly suitable for use in the tube supports of a standard commercial fluorescent tube housing.

14 Claims, 3 Drawing Sheets

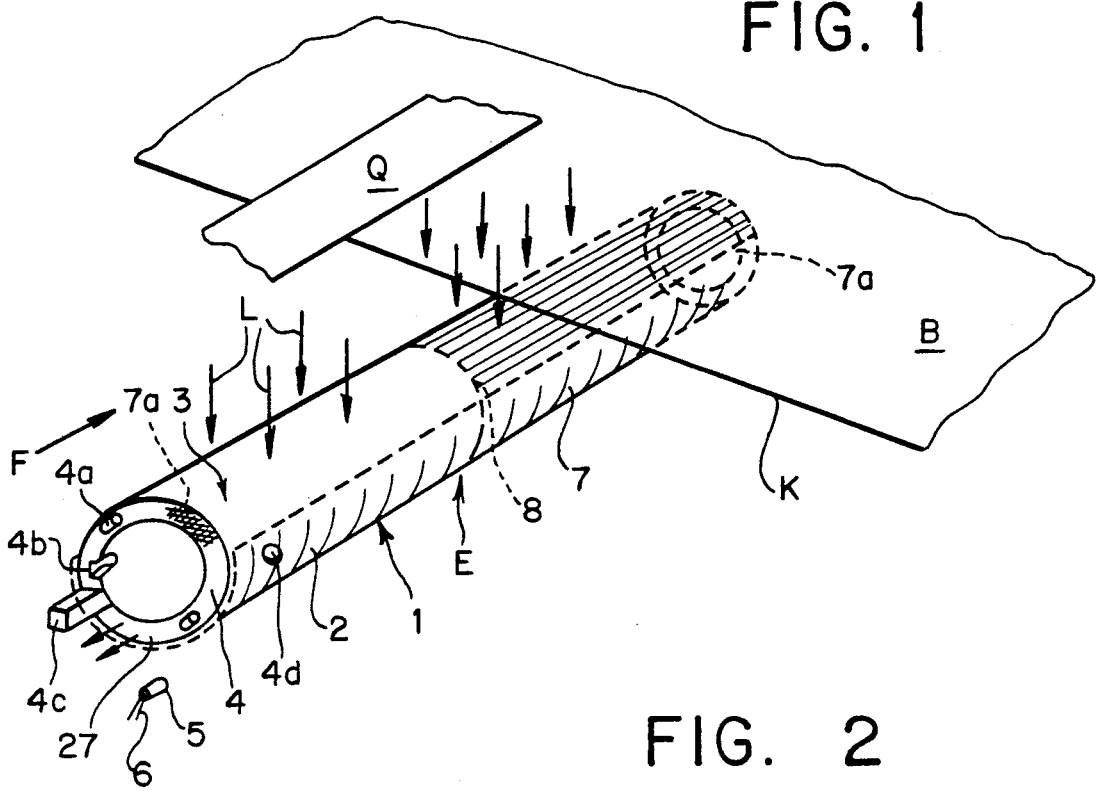
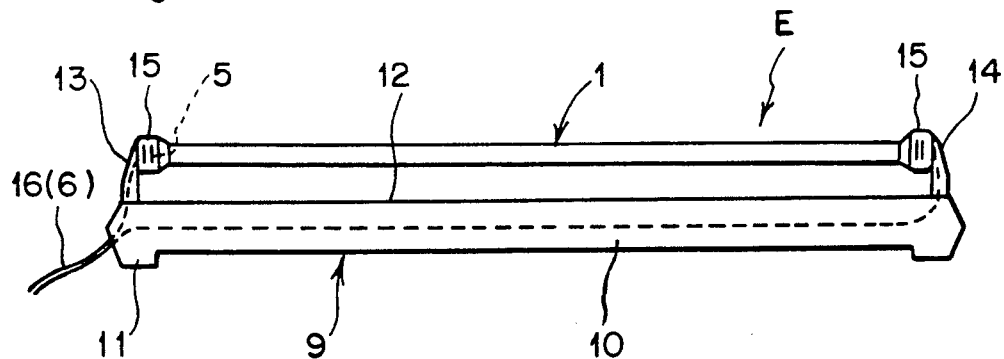
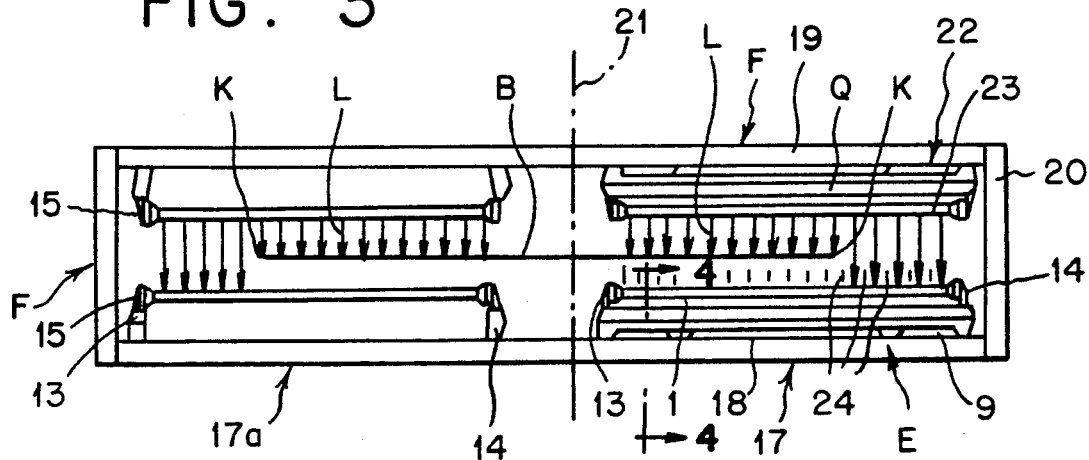

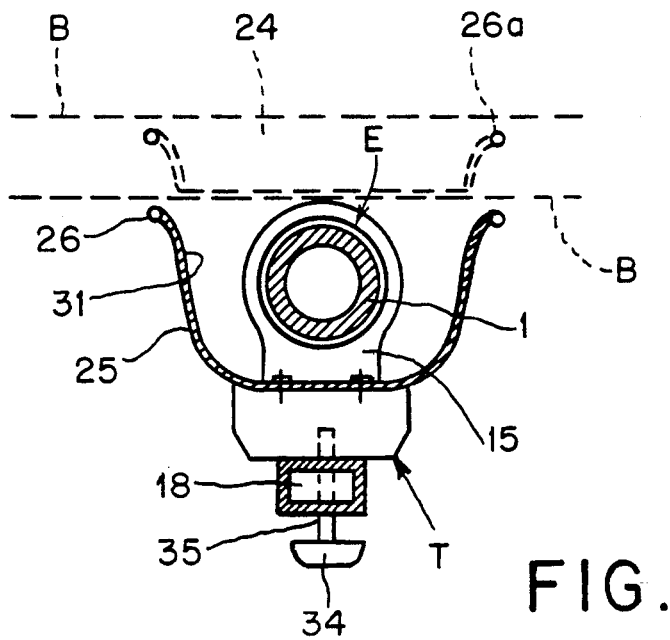
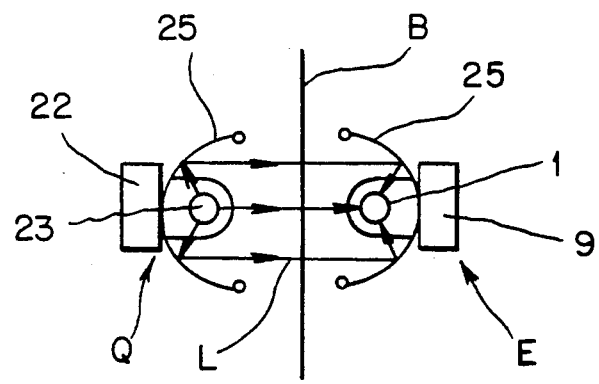
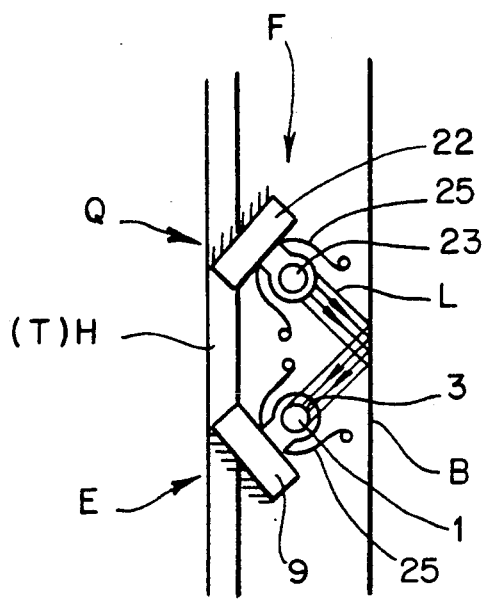

EDGE SENSOR FOR A MOVING STRIP OF MATERIAL

BACKGROUND OF THE INVENTION

1. Field of the Invention

The invention relates to an edge sensor for a moving strip of material.

2. The Prior Art

The use of an active receiver element made of a plastic with light-collecting properties is known for such edge sensors. For this purpose, the receiver element is usually structured as a film or flexible sheet, which is positioned on the inside of a translucent holder which extends over the length of the receiver element and encapsulates it, with the light entry surface aligned with the light. The holder serves not only to position the receiver element and to protect it, but also, the receiver element is fixed in the edge sensor by means of the holder. It is disadvantageous in this that the translucent holder not only absorbs part of the light intended for the receiver element, but also results in a multi-part and complicated structure of the edge sensor. This is because the holder is fixed and positioned in the edge sensor with specially adapted attachment elements. Finally, the complicated structure is undesirable also in view of the usually limited space available.

The light-collecting plastic used for manufacturing the receiver element is, for example, explained in detail in data sheet KL 47310 dated Mar. 1, 1981 by the company Bayer AG. These are fluorescent-pigmented, light-collecting and light-conducting polymers of high optical purity. In this, the transparent plastic forms a system with a fluorescence pigment, which absorbs direct or diffuse light, and emits it in the plastic matrix as fluorescent radiation. If the plastic is present in sheet form, the absorbed light is transported to the edge of the sheet by total reflection, and emitted there. The good total reflection results in a relatively thin sheet thickness.

SUMMARY OF THE INVENTION

It is an object of the present invention to provide an edge sensor for a moving strip of material, which is characterized by a space-saving and significantly simplified structure, and an improved utilization of light.

The self-supporting, elongated element made of light-collecting plastic can be directly held without noteworthy structural effort, which eliminates an additional holder for positioning and supporting the receiver element. Thanks to its self-supporting property, the elongated element does not require any protection against contact with the strip, because it deals easily with any forces which occur in that connection. The self-supporting structure of the tube-shaped element has the further advantage of an increased light-collection and amplification effect. Together with the measure of placing the self-supporting element made of light-collecting plastic opposite the strip to be scanned directly, i.e. without any protective element, the unhindered incident light results in greater performance of the receiver element, so that less energy is required than before. The additional material needed for the self-supporting structure of the element is certainly justified by the savings in separate holders and mounting parts. In addition, assembly and maintenance are made simple, because the self-supporting element can be handled like a rigid element in the receiver. Unexpectedly, the self-supporting element made of light-collecting plastic yields an improved response behavior to light changes and a high resistance to mechanical wear. It can be cut off from a continuous profile in any desired length, and adapted to the conditions of use in each case. In this manner, the production effort and the production costs are drastically reduced.

An especially important embodiment is the following. With regard to the effort to manufacture edge sensors in as simple, cost-effective and robust a manner as possible, the use of a commercially available fluorescent tube holder to hold the hollow element fulfills all requirements. Such light fixtures, which are commercially available in different sizes, are inexpensive and easy to install. The hollow element made of light-collecting plastic is inserted instead of the fluorescent tube installed otherwise, so to speak. The light fixture itself primarily has the function of holding and positioning the element; secondarily, the components provided on it by the manufacturer can also be used for the special purpose of edge scanning, for example the tube holders, any shielding that might be provided, etc.

If the elongated element made of light-collecting plastic corresponds exactly to the dimensions of the fluorescent tube otherwise used, no modifications of the tube holders of the light fixture are necessary. However, in order to take the special requirements in housing the light exit and, if applicable, the light detector(s), into account, the tube holders can be adapted to the ends of the hollow element, or the end caps pursuant to the holders or sockets in each case.

Another embodiment is as follows. This cover serves to screen off any inflow of outside light, which could be harmful, and increases the degree of effectiveness of the light-collecting plastic of the hollow element. Only the light impacting from the light source penetrates into the receiver part, and is transported to the light detector in the special plastic. In this, the tube shape offers a special advantage for light transport and for strength.

Another structurally simple, robust and cost-effective embodiment for scanning an edge is as follows. The edge sensor consists of a few components which can be cost-effectively and easily produced for the purposes of use in each case. The light fixtures, i.e. fluorescent tube housings, are commercially available and are acquired and used in the size required in each case. It is even sufficient to affix only the socket to the carrier profile, in order to set both the light source and the receiver element. It is sufficient in this if the edge sensor only projects beyond the edge area of the strip of material. By eliminating complicated positioning and holder devices, low dimensions are obtained, which are advantageous for the space conditions at the strip, which are frequently limited.

As an alternative to this, an embodiment for scanning both edges of a strip, is also practical. Here, a pair of such light source/receiver element units is provided in the mounting frame for each edge, which can be achieved by affixing sockets on the carrier profile.

An especially important embodiment is as follows. Because of the U-shaped or parabolic cross-sectional shape, the carrier profile gains greater rigidity, and can therefore be formed more easily. In addition, the upswept walls offer protection against external influences for the light source, but especially also for the receiver element.

Furthermore, the shape of the carrier profile lends itself to being used as a reflector for the receiver element, but also for the light source. The surface, coated for this purpose, reflects the light onto the desired zone.

Another embodiment has proven to be extraordinarily advantageous. The common attachment housing for the light collection tube, in other words the receiver element, and the light source, allow an apparatus part to appear like a structural unit, which is very simple, on the one hand, while it takes up very little space, on the other hand, and finally, guarantees constancy in the assignment of the individual parts. Using the slide guide mounting of the attachment housing on the carrier profile, the receiver element and the light source can be easily and quickly adjusted to the edge of the strip of material. All that is necessary is for a setting screw to be loosened, and the attachment housing can be freely pushed out of the carrier profile. This is particularly practical if the light source and the receiver element are parts held on one side, which enclose the border of the strip of material like a fork. It is advantageous if the free end of the tube-shaped element is rounded off and closed.

Another, embodiment is as follows. Here, the edge sensor functions according to the reflection principle, but only on one side of the strip of material. In the aforementioned embodiments, the practical modular principle can be profitably applied, because the individual components brought together to form the type of edge sensor in each case can be manufactured in simple manner, and fit together exactly, in the most varied combinations. This simplifies manufacture, repairs, inventory and shipping.

Finally, another important embodiment is as follows. The light screen or lens band reduces the influence of outside light and also ensures that the element is only impacted with parallel light segments, which increases the scanning accuracy. The light screen, i.e. the lens band, also has a protective function for the hollow element directly adjacent to the strip.

BRIEF DESCRIPTION OF THE DRAWINGS

Embodiments of the object of the invention are explained on the basis of the drawings, as examples.

The drawings show:

FIG. 1 a schematic perspective view of an edge sensor,

FIG. 2 a front view of a part of an edge sensor,

FIG. 3 a front view of two additional embodiments,

FIG. 4 a schematic cross-section in the plane IV—IV of FIG. 3,

FIG. 5 another embodiment in a cross-section,

FIG. 6 a further embodiment in a cross-section,

DETAILED DESCRIPTION OF THE PREFERRED EMBODIMENT

Figure 7:
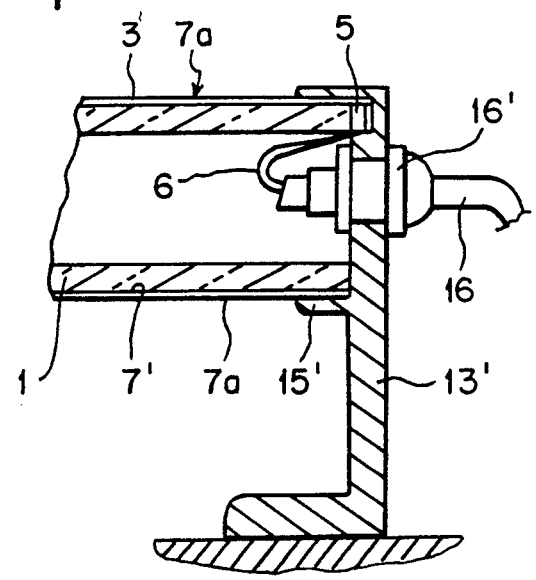
FIG. 7 a detailed cross-section.

To scan the edge K of a moving strip of material B, e.g. in a strip guide device in the processing of strips of material, a light source Q is provided, which lies on one side of the strip of material B and directs light L onto the strip of material B like a curtain. On the opposite side of the strip of material B, a receiver element E is provided, which essentially contains an elongated hollow element 1, e.g. in tube shape. The hollow element 1 consists of a light-collecting plastic and is structured to be self-supporting. The light entry surface of the hollow element 1, designated as 3, is directly exposed to the light L which passes the edge K of the strip B. The plastic material 2 of the element 1 has the property of passing the light entering through the light entry surface 3 to a light exit 4 (here, the frontal end of the element 1) by total reflection and light amplification, caused by fluorescent additives in the plastic, and of emitting it there. The light concentration at the light exit 4 is proportional to the position of the edge K in the sensor range, so that a clear, most practically an analog signal can be produced at a light detector 5, e.g. a photo diode or photo cell, positioned at the light exit 4. In FIG. 1 it is indicated that the strip of material B covers an area of the light entry surface 3 which is cross-hatched lengthwise, which is not impacted by the emitted light L. To avoid any influence of outside light, it is practical if the surface of the element 1 is provided with a cover or coating 7 outside the light entry surface 3; this is also provided at the frontal ends of the element 1 and designated as 7a. If the element 1 has tube-shaped structure, then its inside circumference surface can also be made reflective. Pursuant to FIG. 7, the hollow element 1 can be covered with a crystal-clear shrink-wrap hose 7', which protects the surface, holds the covering 7 in place and closes off any bore holes.

The hollow element 1 can be structured as a self-supporting tube, i.e. it can be attached at its ends like a rigid component, and does not require any supporting or positioning devices. Other cross-sectional shapes, e.g. triangular, oval, rectangular, are also possible.

The light exit 4 can be structured in different ways. In FIG. 1, either dead-end bores 4a or groove-like cut-outs 4b or block-shaped projections 4c formed in the frontal ends of the element 1, or wart-like elevations at the outside or inside circumference surface are provided, at which the concentrated light exit 4 takes place and where the light detector 5, or possibly even several light detectors 5, are attached. From each light detector 5, signal lines 6 lead, via amplification and evaluation circuits which are not shown, to the control unit of a strip guide device, which brings the strip B back into its required position if the edge K runs out of line. In FIG. 1, the element 1 of the receiver element E is held in place by the edge sensor F in holders which are not shown, in such a way that its light entry surface 3 faces the light L. At 8, the edge of the shadow of the edge K on the light entry surface 3 is indicated with a broken line. Bores 29 (FIG. 8) can also be provided, distributed over the length of the hollow element 1, in each of which a light detector 5' is located, in order to compensate light conduction losses. The light detectors 5' are part of a circuit board 29 which is attached on the inside.

FIG. 2 illustrates a concrete embodiment of a receiver element E of such an edge sensor F. Here, a commercially available fluorescent tube housing 9 serves as the basic shape and to hold the tube-shaped hollow element 1 made of light-collecting plastic, most practically a light fixture intended for use in damp areas, which has a basic element 10 with attachment parts 11 and a top 12 for possibly attaching a reflector shield, not shown. Furthermore, conventional tube holders 13 and 14 with sockets 15 for the light source Q, in other words actually the fluorescent tube, are provided on the basic element 10. The hollow element 1 is held with the tube holders 13, 14 and the sockets 15; due to its self-supporting properties, it extends freely between the holders 13, 14. It is practical if the ends of the hollow element 1 are held in the two tube holders 13, 14, and if light detectors 5 are housed there, with these being connected to the evaluation circuit by means of the supply lines 16 which are present in the fluorescent tube housing 9 in any case, so that the lines provided by the manufacturer function as signal lines 6. The tube holders 13, 14 and sockets 15 of conventional fluorescent tube housings 9, which are inexpensively available in different common sizes, allow easy assembly of the element 1, and disassembly at any time.

FIG. 3, on the right half, shows an embodiment of an edge sensor F, which is intended for scanning only one edge K of the strip B. In an assembly frame 17 with a fork-shaped structure, on the top, a commercially available light fixture 22 with a fluorescent tube 23 as the light source Q, and, facing the other side of the strip of material, the commercially available fluorescent tube housing 9 with the hollow element 1 instead of a fluorescent tube are attached to the two frame braces 18, 19, on both sides of the strip of material B in the edge area. A cross-brace 20 connects the braces 18, 19 and makes it possible to attach the edge sensor F at the desired location of the braces B [sic]. The part of the light L not screened off by the strip of material B impacts on the hollow element 1 made of light-collecting plastic, where it is practical if this is self-supporting, which is fixed in its working position with the tube holders 13, 14. In order to eliminate the influence of outside light, a light screen 24 can be provided at the receiver element E. This also shields the hollow element 1 against direct contact with the strip B as it passes through. If necessary, a light screen 24 is also provided in front of the fluorescent tube 23. In the edge sensor F (right half of FIG. 3) for one edge of the strip, the braces 18, 19 end at the separation line 21 indicated with a dot-dash line.

An edge sensor F for simultaneous scanning of both edges K of the strip B (left half of FIG. 3) (center control) has a rectangular frame 17a with an inside clear width which is greater than the width of the strip. Both strip edges K are then each assigned a pair of a light fixture 22 as described above with a fluorescent tube 23, and fluorescent tube housings 9 with hollow elements 1. It is not absolutely necessary to use a fluorescent tube housing 9. It is entirely sufficient if the holders 13, 14 with the sockets 15 are directly attached to the assembly frame 17. In this case, there is the possibility of holding the holders 13, 14 in a slide mounting, held in place with a locking screw 34, as indicated in FIG. 3 on the left side, and described in more detail below in connection with FIG. 9. In order to prevent damage to the light detectors 5 in case of unintentional incorrect assembly, right from the start, it is very important to structure the hollow elements 1 so that they are shorter than the fluorescent tubes 23, i.e. also to provide shorter housings 9 than the housings of the light fixtures 22. Therefore, the hollow elements 1, with the light detectors 5 already installed, cannot be accidentally inserted into the wrong housings. This measure is also practical because the lighting strength of the fluorescent tubes 23 decreases at the ends, in any case, and it is better if the light at the end does not have to be used for scanning.

FIG. 4 indicates another embodiment on the basis of a cross-section in the plane IV—IV of FIG. 3. The tube holder 14 with the socket 15 is held in place at the frame brace 18 by means of a locking screw 34, with this locking screw 34 engaging through a longitudinal slit 35 in the frame brace 18, and being guided in it as a locking slide mounting, so that the socket 15 for the receiver element E and also for the light source Q can each be individually adjusted for each position. By means of the tube holders 14, it holds the hollow element 1 so that it faces the strip B (shown with a broken line). In addition, pursuant to FIG. 4, a half-round or parabolic reflector shield 25 is attached to the tube holders 13, 14, or to the frame brace 18, where it is practical if the rounded edges 26 of this shield lie higher than the top of the hollow element 1, so that the strip B, which hangs through, can rest on them.

Furthermore, the reflector shield 25 can be structured higher, and contain the light screen 24 indicated in FIG. 3, so that an additional protection for the hollow element 1 is provided, and the influence of outside light is eliminated. The light screen 24 has the advantage that only parallel beams of light are allowed to pass through to the element 1, which increases the sensor accuracy. If the strip B hangs through, it then comes to rest on the edges 26a of the higher reflector shield 25, or on the light screen 24, without touching the hollow element 1. Instead of a light screen, a lens adaptor, e.g. a lens band, can also be attached.

FIG. 5 is to be understood as a schematic cross-section of FIG. 3, and shows both the light source Q and the receiver element E, fixed to the carrier profile T, each with a reflector shield 25 of the type described above. This has the advantage that the hollow element 1 made of light-collecting plastic is impacted with the incident light over its entire circumference, with the indirect segments being passed to the hollow element surface by the reflector shield.

In the embodiment pursuant to FIG. 6, the edge sensor F functions according to the reflection principle. The light source Q and the receiver element E are attached on the same side of the strip, in a holder H or a carrier profile T. The fluorescent tube 23 is inserted in the commercially available light fixture 22 with the reflector shield 25. The light fixture 22 is placed at an angle, so that the light L impacts on the strip B at an angle. The fluorescent tube housing 9, which holds the hollow element 1 and also has a reflector shield 25, is also placed at an angle in the holder H, so that the light L reflected by the strip B impacts on the hollow element 1. The use of a self-supporting hollow element 1 made of light-collecting plastic has the advantage that no special parts for holding the hollow element 1 are required. Commercially available light fixtures or even only their sockets 15, used to hold the hollow element 1 like a fluorescent tube, are inexpensive and simple in terms of assembly technology. The edge sensor F is adapted to the requirements in each case, according to the modular principle, right from the start, with a large portion of the elements used being purchased items. It is practical if the hollow element 1 is cut from a continuous profile, to the length required in each case. For a broad, aligned light distribution, aluminum reflector shields 25 can be subsequently attached to the light fixture 22 and the fluorescent tube housing 9. The reflector shield 25 offers the self-supporting element 1 made of light-collecting plastic additional protection. Furthermore, light screens 24 can be attached to increase the accuracy of the light amount measurement, offering additional mechanical protection and dust protection for the hollow element 1 made of light-collecting plastic, and also for the fluorescent tube. Since a large number of the elements of the edge sensor F are purchased parts, edge sensor with different construction can be manufactured and used, at low cost, according to the modular principle. The manufacturing cost is reduced; keeping inventory on hand is simplified, shipping can be carried out without problems, because some of the components can be procured directly at the installation location. Light fixtures for use in damp area, as such, are suitable for use in edge scanning of wet or damp strips, right from the start, so that additional protective measures are not at all necessary.

Pursuant to FIG. 7, the hollow element 1 is structured as a tube or as a strip pulled into a tube, and fixed in the receiver E with holders 13' adapted to the tube diameter, so that a light entry surface 3 faces the strip. The holder 13', structured as a molded part, has a socket 15' for one end of the hollow element 1, and to house at least one light detector 5. The signal lines 6 are protected in a cable 16, which runs to the outside through a water-proof bushing 16'. The cover 7 is attached to the hollow element 1 facing away from the light entry surface 3. This can be a reflective coating or an opaque or possibly reflective film. To protect and seal it, as well as to fix the cover 7 in place, the hollow element 1 is covered with a crystal-clear film 7a on the outside, e.g. a thin shrink-wrap hose.

Figure 8:
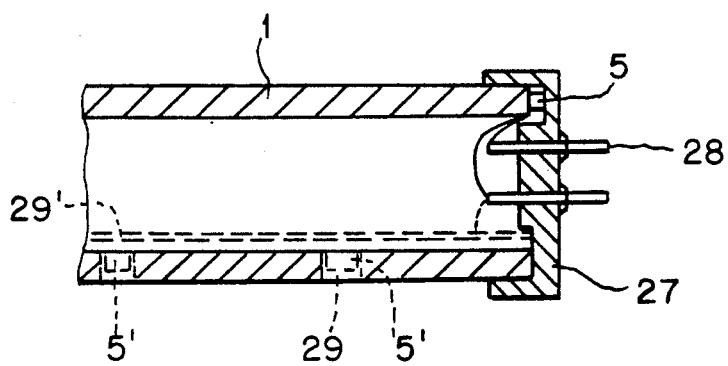
FIG. 8 another detailed cross-section.

FIG. 8 shows that the hollow element 1 can be equipped with an end cap 27, like a conventional fluorescent tube, which then fits into the holder 13, 14 of the light fixture housing 9 (FIG. 2) or also into the holder 13' (FIG. 7). Light detectors 5 can also be positioned right into the end caps 27, connected to contact pins 28 via their signal lines 6. These contact pins 28 fit into the contact sites, e.g. of the socket 15. It is only important that high-quality, non-oxidizing materials are used for the contact pairs, in order to assure constant voltage or signal transmission conditions.

In FIG. 8, it is indicated as an additional variation that several light detectors 5' are distributed over the length of the hollow element 1, in order to compensate possible light conduction losses. The light detectors 5' engage into bore holes 29 of the hollow element 1 and are located on a circuit board 29' positioned on the inside of the hollow element 1.

The hollow element 1 does not have to be continuous in the circumference direction. It could be bent into an essentially closed or also into a rectangular or channel-shaped cross-section from a strip of the light-collecting plastic 2, provided that with the cross-sectional shape selected, a certain minimum rigidity can be achieved over the length, along with a large light entry surface 3.

Figure 9:
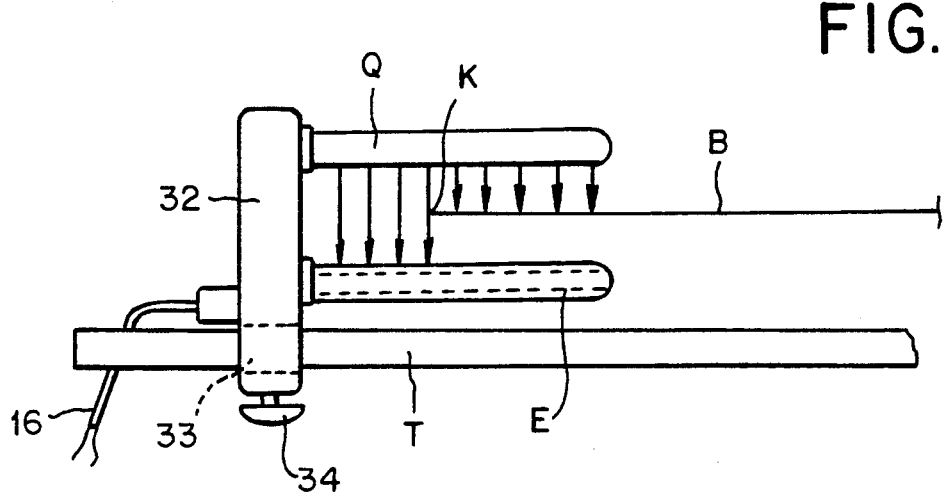
FIG. 9 a special structure of the edge sensor.

FIG. 9 shows a fork-shaped embodiment of an edge sensor F, in which the light source Q and the receiver element E are both attached on one side in an attachment housing 32, and extend beyond one edge K of the strip of material B. The attachment housing 32 is mounted so that it can be moved longitudinally on the carrier profile T, in a slide guide 33 which is indicated, and is fixed in place with a locking screw 34. From the attachment housing 32, the supply line 16 runs to the control and recording devices, not shown. The carrier profile T has a U-shaped or parabolic cross-section, thereby surrounding the receiver element E by about half, with the inside surface of the carrier profile having a reflective coating.

We claim:

1. An edge sensor for a moving strip of material, with an elongated light source and a receiver aligned with it, which has an active receiver element made of a plastic with light collecting properties, which has an elongated light entry surface and at least one light exit, at which at least one light detector is provided, characterized by the fact that the receiver element is a supported tube-shaped element made of light-collecting plastic, which is fixed in a holder on a carrier profile in such a way that its light entry surface is directly exposed to the light directed onto the strip of material by the light source.

2. An edge sensor pursuant to claim 1, characterized by the fact that the receiver element is held in the tube holders of a fluorescent tube housing at its ends.

3. An edge sensor pursuant to claim 1, characterized by the fact that end caps with light detectors and connection contacts, made of non-oxidizing material, which can be inserted into the tube holders, are attached at the ends of the tube-shaped element.

4. An edge sensor pursuant to claim 1, characterized by the fact that the receiver element, as a tube-shaped element made of light-collecting plastic, has an opaque coating outside of its light entry surface.

5. An edge sensor pursuant to claim 1, characterized by the fact that the carrier profile is structured as a fork-shaped carrier frame and goes beyond at least the edge of the strip of material, and which carries the light source on the one side and the receiver element made of light-collecting plastic on the other side, on both sides of the strip of material, on the two frame braces.

6. An edge sensor pursuant to claim 1, characterized by the fact that the carrier profile is a rectangular assembly frame with a clear width which exceeds the width of the strip, at the longitudinal braces of which light sources and receiver elements are provided opposite one another, which are opposite each other in pairs at each edges of the strip of material, and of which each light source is equipped with a fluorescent tube and each receiver element is equipped with a tube-shaped element made of light-collecting plastic.;

7. An edge sensor pursuant to claim 1, characterized by the fact that the carrier profile has a U-shaped or parabolic cross-section, within which the receiver element is held.

8. An edge sensor pursuant to claim 1, characterized by the fact that the inside surface of the carrier profile is covered with a reflective layer.

9. An edge sensor pursuant to claim 1, characterized by the fact that the receiver element and the light source are jointly held by an attachment housing, which is held on the carrier profile in a slide guide.

10. An edge sensor pursuant to claim 1, characterized by the fact that a light source and a receiver element are attached in a holder on one side of the strip of material, of which the light source has a fluorescent tube and a reflector shield inclined at an angle to the strip of material, and the receiver element, as a tube-shaped element made of light-collecting plastic, with a reflector shield placed behind it, are held in such a way that the light entry surface and the reflector shield are aligned with the reflection light from the strip of material.

11. An edge sensor pursuant to claim 1, characterized by the fact that at least the receiver element has alight screen or a lens adapter, placed in front of it.

12. Edge sensor for a moving strip of material with an elongated light source and a light receiving part having a supported elongated form part, which has an elongated light entry surface, which is directly exposed to the light directed onto the strip of material by the light source, and which elongated form part has on its front side at least one light exit, on which at least one light detector is proposed, characterized in that the form part is a tube body (tube-shaped element) made of light-collecting plastic containing fluorescent material, and being fixed on the front side on a foundation by holders.

13. Edge sensor according to claim 12, characterized in that the tube body is fixed directly in at least one stationary holder of the light receiver element, the holder being equipped with a support.

14. Edge sensor according to claim 12, characterized in that the tube body is held with its ends in the holders of a light housing.

* * * * *